US009876966B2

(12) United States Patent
Wang et al.

(10) Patent No.: US 9,876,966 B2
(45) Date of Patent: Jan. 23, 2018

(54) SYSTEM AND METHOD FOR DETERMINING IMAGE VARIATION TENDENCY AND CONTROLLING IMAGE RESOLUTION

(71) Applicant: PixArt Imaging Inc., Hsin-Chu (TW)

(72) Inventors: Guo-Zhen Wang, Hsin-Chu (TW); Yu-Hao Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/011,676

(22) Filed: Feb. 1, 2016

(65) Prior Publication Data

US 2016/0150163 A1 May 26, 2016

Related U.S. Application Data

(63) Continuation-in-part of application No. 14/283,235, filed on May 21, 2014, now abandoned.

(30) Foreign Application Priority Data

Oct. 18, 2013 (TW) .............................. 102137768 A

(51) Int. Cl.
*G06F 3/01* (2006.01)
*H04N 5/265* (2006.01)
*H04N 5/232* (2006.01)
*G06F 3/03* (2006.01)
*G06K 9/00* (2006.01)

(52) U.S. Cl.
CPC ............. *H04N 5/265* (2013.01); *G06F 3/017* (2013.01); *G06F 3/0304* (2013.01); *G06K 9/00355* (2013.01); *H04N 5/23232* (2013.01)

(58) Field of Classification Search
CPC .................................. G06F 3/013; G06F 3/017
See application file for complete search history.

(56) References Cited

U.S. PATENT DOCUMENTS

| 7,728,891 | B2 | 6/2010 | Hiyama |
| 8,102,436 | B2 | 1/2012 | Miyakoshi |
| 8,356,254 | B2 | 1/2013 | Dennard |
| 8,406,479 | B2 | 3/2013 | Tsukizawa |
| 8,761,459 | B2 | 6/2014 | Kanede |
| 2004/0141067 | A1 | 7/2004 | Nakayama |
| 2006/0088191 | A1* | 4/2006 | Zhang ................ G06K 9/00711 382/107 |

(Continued)

FOREIGN PATENT DOCUMENTS

| CN | 1233336 A | 10/1999 |
| CN | 1426046 A | 6/2003 |

(Continued)

Primary Examiner — Gene W Lee
(74) Attorney, Agent, or Firm — Winston Hsu

(57) ABSTRACT

An image processing method applied to an image processing system comprising an image sensor. The image processing method comprises: (a) capturing a plurality of first images via the image sensor applying a first resolution; (b) computing an image variation tendency for the first images; and (c) controlling the image sensor to apply a second resolution higher than the first resolution if the image variation tendency matches a predetermined tendency. An image processing system applying the image processing method is also disclosed.

12 Claims, 5 Drawing Sheets

(56) References Cited

U.S. PATENT DOCUMENTS

| | | | |
|---|---|---|---|
| 2010/0322476 A1* | 12/2010 | Kanhere | G06T 7/0065 |
| | | | 382/103 |
| 2012/0062729 A1 | 3/2012 | Hart | |
| 2012/0272179 A1 | 10/2012 | Stafford | |
| 2013/0004016 A1* | 1/2013 | Karakotsios | G06K 9/00355 |
| | | | 382/103 |
| 2013/0044055 A1 | 2/2013 | Karmarkar | |
| 2013/0100097 A1 | 4/2013 | Martin | |
| 2013/0106681 A1 | 5/2013 | Eskilsson | |
| 2013/0258087 A1 | 10/2013 | Jeong | |
| 2013/0321265 A1 | 12/2013 | Bychkov | |
| 2014/0129990 A1* | 5/2014 | Xin | G06F 3/017 |
| | | | 715/849 |
| 2014/0149754 A1* | 5/2014 | Silva | G06F 1/3212 |
| | | | 713/300 |
| 2014/0359272 A1* | 12/2014 | Hiltunen | G09C 1/00 |
| | | | 713/150 |
| 2014/0375541 A1 | 12/2014 | Nister | |

FOREIGN PATENT DOCUMENTS

| | | | |
|---|---|---|---|
| CN | 101047797 A | 10/2007 | |
| CN | 101119448 A | 2/2008 | |
| CN | 101385334 A | 3/2009 | |
| CN | 101489467 A | 7/2009 | |
| CN | 101917601 A | 12/2010 | |
| CN | 102375974 A | 3/2012 | |
| CN | 102902967 A | 1/2013 | |
| JP | 9214836 A | 8/1997 | |

* cited by examiner

SYSTEM AND METHOD FOR DETERMINING IMAGE VARIATION TENDENCY AND CONTROLLING IMAGE RESOLUTION

CROSS REFERENCE TO RELATED APPLICATIONS

This application is a continuation-in-part application of applicant's earlier application, Ser. No. 14/283,235, filed 2014 May 21, and is included herein by reference.

BACKGROUND OF THE INVENTION

1. Field of the Invention

The present invention relates to an image processing method and an image processing system, and particularly relates to an image processing method and an image processing system which can automatically switch resolution and/or frame rate according whether a specific operation is performed or not.

2. Description of the Prior Art

A conventional image processing system always comprises an image sensor and a digital signal processor. The digital signal processor is activated if brightness variation for images captured by the image sensor is over a threshold value. After that, the images captured by the image sensor is transmitted to the digital signal processor for further processing (ex. subtracting an image from another image).

The brightness variation maybe caused by environment or by gesture. However, the above-mentioned mechanism is hard to distinguish the gesture from the captured image. Further, it is hard to select an ideal resolution for the image sensor and an ideal frame rate. If the resolution and the frame rate are too high, too much power is wasted if no gesture is performed for a long period of time. On the contrary, if the resolution and the frame rate are too low, it is hard to correctly determine the gesture.

SUMMARY OF THE INVENTION

One objective of the present application is to provide an image processing method which can distinguish between environment images and gesture images and corresponding select resolution and/or frame rate.

Another objective of the present application is to provide an image processing system which can distinguish between environment images and gesture images and corresponding select resolution and/or frame rate.

One embodiment of the present invention provides an image processing method applied to an image processing system comprising an image sensor. The image processing method comprises: (a) capturing a plurality of first images via the image sensor applying a first resolution; (b) computing an image variation tendency for the first images; and (c) controlling the image sensor to apply a second resolution higher than the first resolution if the image variation tendency matches a predetermined tendency.

Another embodiment of the present invention provides an image processing system comprising: an image sensor, configured to capture a plurality of first images via the image sensor applying a first resolution; a digital signal processor, configured to compute an image variation tendency for the first images; wherein the image sensor applies a second resolution higher than the first resolution if the image variation tendency matches a predetermined tendency.

In view of above-mentioned embodiments, the environment images and gesture images can be clearly distinguished, and the best resolution for an image sensor and/or the best frame rate can be selected.

These and other objectives of the present invention will no doubt become obvious to those of ordinary skill in the art after reading the following detailed description of the preferred embodiment that is illustrated in the various figures and drawings.

DETAILED DESCRIPTION

Following embodiment will explain the image processing method and the image processing system provided by the present invention. Please note these embodiments are only example for explaining the concept of the present invention, but does not mean to limit the scope.

Figure 1:
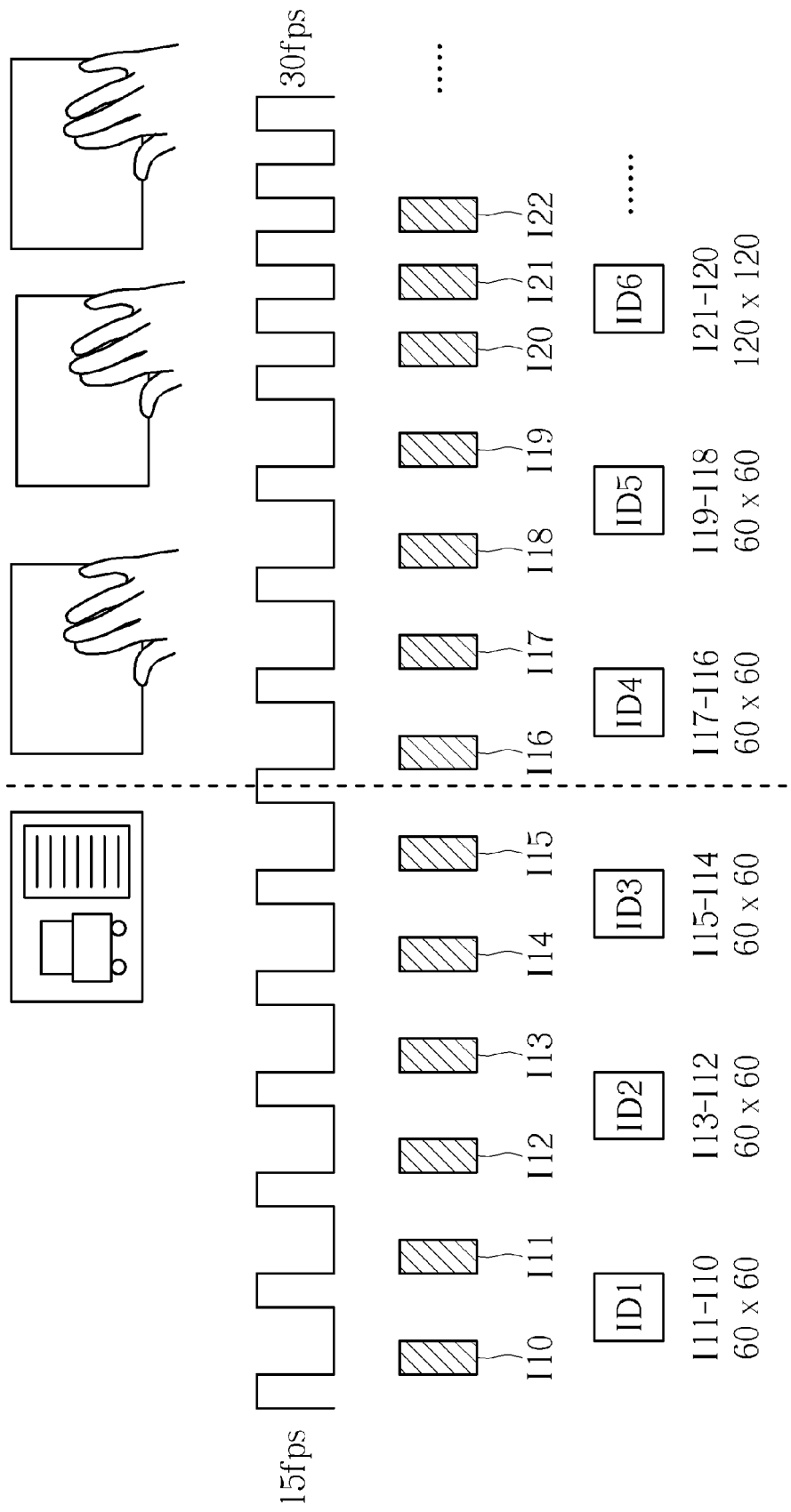
FIG. 1 is a schematic diagram illustrating an image processing method according to one embodiment of the present invention.

FIG. 1 is a schematic diagram illustrating an image processing method according to one embodiment of the present invention. As illustrated in FIG. 1, the image sensor firstly applies a first resolution and/or a first frame rate to capture a plurality of first images I10-I19. Then, the image variation tendency for the first images I10-I19 is computed. After that, the image sensor is controlled to apply a second resolution higher than the first resolution and/or applies a second frame rate higher than the first frame rate, to capture at least one second image I20, I21, I22 . . . if the image variation tendency matches a predetermined tendency. In one embodiment, the first resolution is 60×60 and the second resolution is 120×120, but not limited. Also, in one embodiment the first frame rate is 15 fps and the second frame rate is 30 fps, but not limited.

For more detail, at the timings for capturing first images I10-I15, no gesture is performed to the electronic apparatus (ex. a mobile phone) comprising the image processing system, thus the first images I10-I15 only comprises content for environment. The image variation tendency of the first images I10-I15 does not meet a predetermined tendency since the images of the environment always have unexpected variation.

After that, at the timings for capturing first images I16-I19, a gesture is performed to the electronic apparatus. In such case, since the gesture indicates predefined operations for a hand (ex. waving), image variation tendency for the images of the gesture will meet a predetermined tendency. Therefore, the image sensor applies a higher resolution and/or a higher frame rate to capture second images I20-I22, thereby the gesture can be more correctly detected.

Many methods can be applied to compute the image variation tendency. Please refer to FIG. 2 again. In one embodiment, the displacement images for consecutive images of the first images are computed. For example, the displacement image ID1 is computed via subtracting the first image I11 from the first image I10. Similarly, the displacement image ID2 is computed via subtracting the first image I12 from the first image I13. After that, the centroids of the displacement images are acquired, which indicate the image variation tendency.

Figure 2:
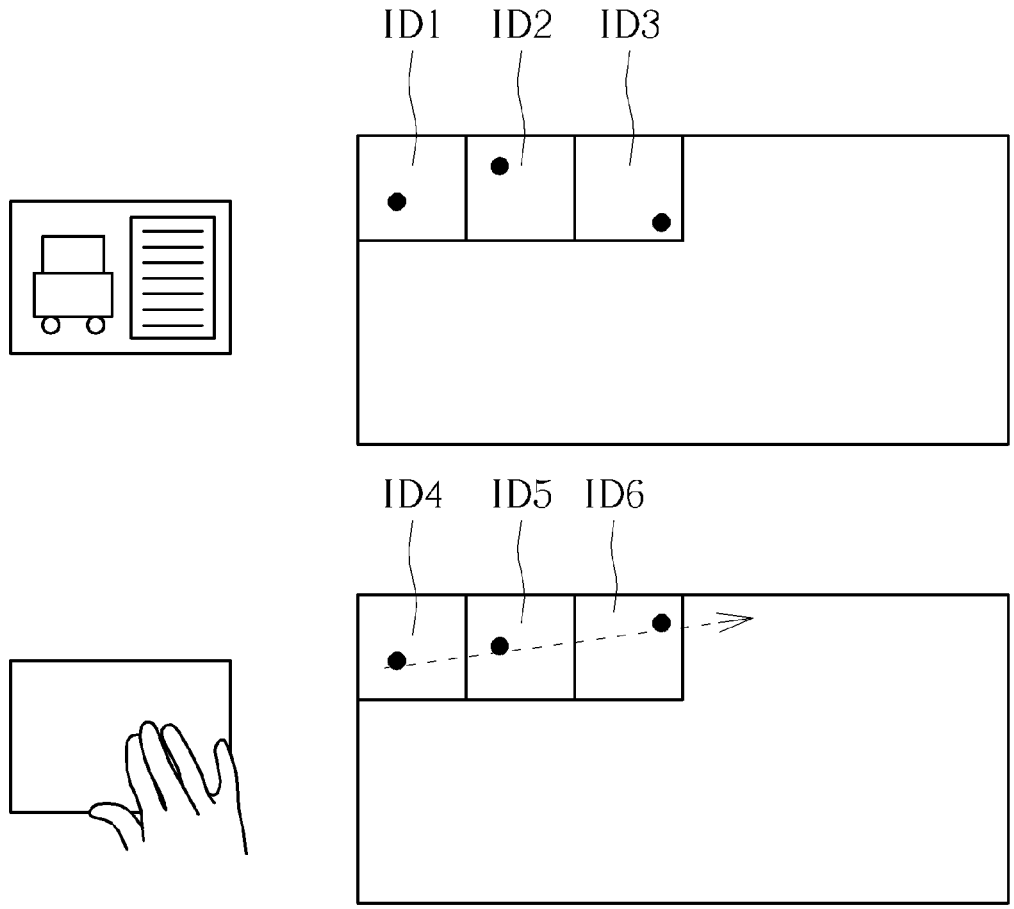
FIG. 2 is a schematic diagram illustrating a more detail embodiment for the embodiment illustrated in FIG. 1.

FIG. 2 is a schematic diagram illustrating a more detail embodiment for the embodiment illustrated in FIG. 1. The displacement images ID1, ID2, ID3 only comprise content of environment, thus a trail for the centroids thereof is random. On the opposite, the displacement images ID4, ID5, ID6 are computed based on images for a gesture, thus the trail for the centroids thereof matches a predetermined trail. In such example, the trail for the centroids of the displacement images ID4, ID5, ID6 is a line gradually goes up.

Please note, only three displacement images are taken for example to explain how to distinguish between the environment images and gesture images. However, more than three displacement images can be applied to distinguish between the environment images and gesture images, and the result can be more accurate in such case. Furthermore, in the embodiment of FIG. 2, the gesture is a waving operation thus the predetermined trail is a line gradually going up. However, if the gesture is an operation which is not a waving operation, the predetermined trail may any other patterns. Please note, the above-mentioned mechanism can be applied to detect any predetermined operation performed by a specific object besides a gesture, for example, a circle drawing operation for a pen.

Also, other parameters of the displacements can be computed to determine the image variation tendency. In one embodiment, the motion vectors of the displacement images are computed and the image variation tendency is determined according to the motion vectors.

Figure 3:
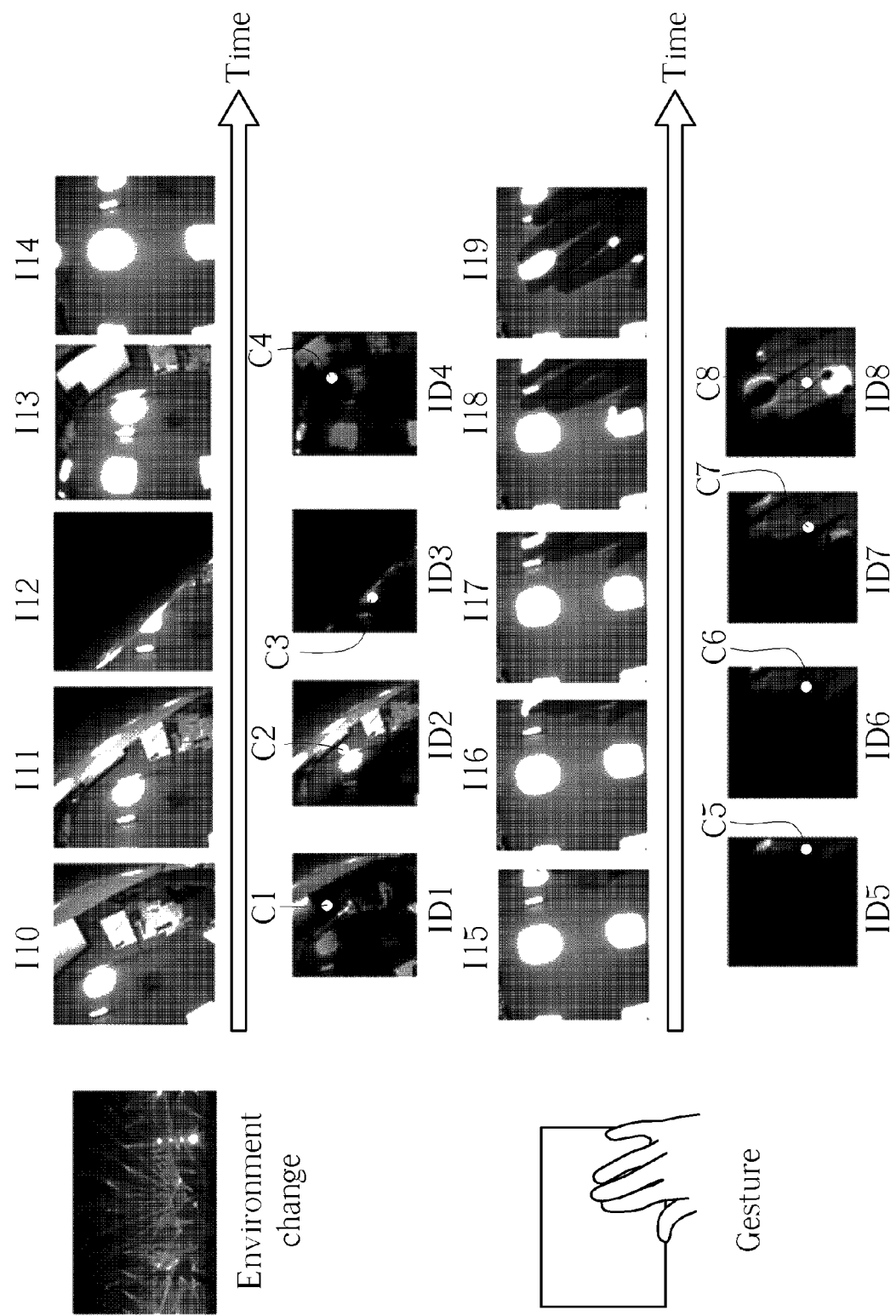
FIG. 3 comprises some figures as an example for the embodiment illustrated in FIG. 2.

FIG. 3 comprises some figures as an example for the embodiment illustrated in FIG. 2. As illustrated in FIG. 3, the first images I10-I14 contains only environment change, thus a trail of centroids C1, C2, C3, C4 for displacement images ID1-ID4 is random. On the opposite, the first images I15-I19 contains images for a gesture, thus a trail of centroids C5, C6, C7, C8 for displacement images ID5-ID6 is a line.

Figure 4:
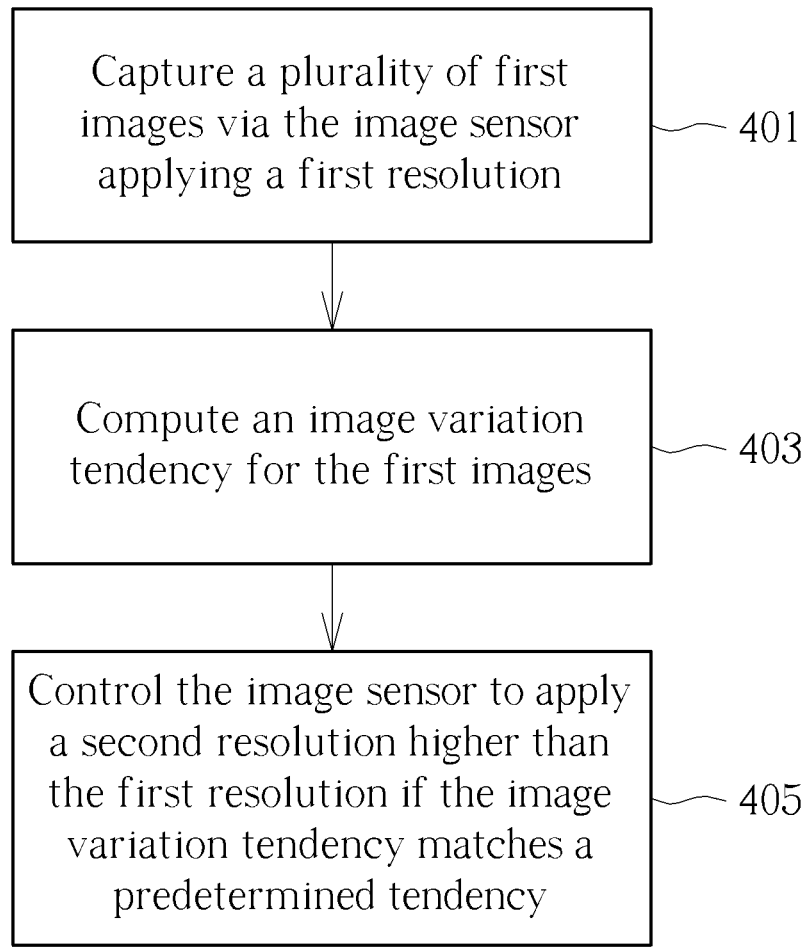
FIG. 4 is a flow chart illustrating an image processing method according to one embodiment of the present invention.

In view of above-mentioned embodiments, an image processing method can be acquired. FIG. 4 is a flow chart illustrating an image processing method according to one embodiment of the present invention, which is applied to an image processing system with an image sensor and comprises following steps.

Step 401

Capture a plurality of first images (ex. I10-I19 in FIG. 1) via the image sensor applying a first resolution.

Step 403

Compute an image variation tendency for the first images. For example, applying the method illustrated in FIG. 2.

Step 405

Control the image sensor to apply a second resolution higher than the first resolution if the image variation tendency matches a predetermined tendency.

In one embodiment, the image processing system further comprises a digital signal processor, which applies the above-mentioned computing operations and subtracting operations. In such case, the image processing method illustrated in FIG. 4 further comprises: detecting if brightness variation for any one of the first images is larger than or equal to a predetermined value; and activating the digital signal processor to perform the step 403 if the brightness variation is larger than or equal to the predetermined value. Please note the brightness variation can correspond to a whole image or only part of the image.

Figure 5:
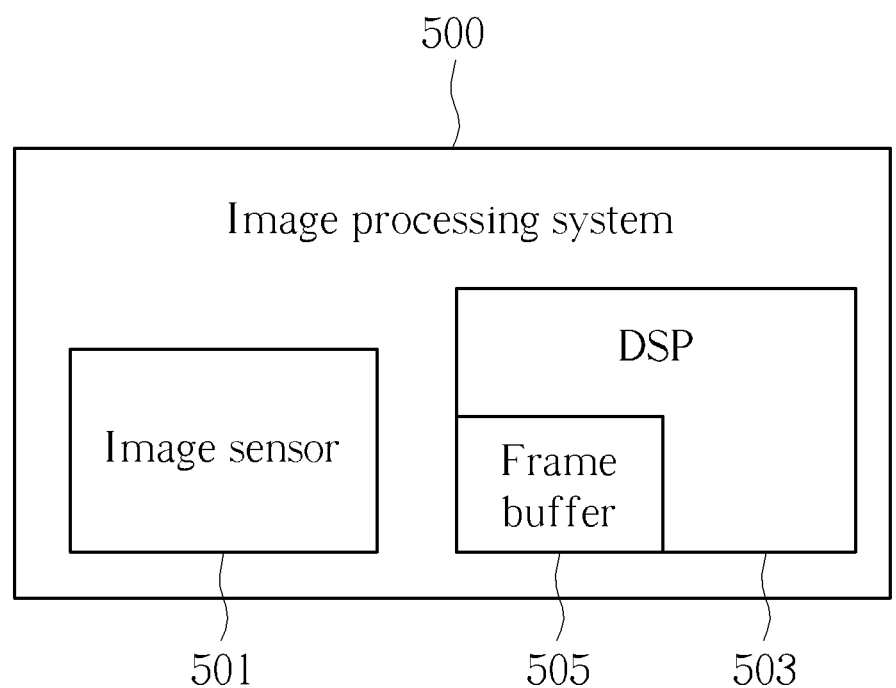
FIG. 5 is a block diagram illustrating an image processing system according to one embodiment of the present invention.

FIG. 5 is a block diagram illustrating an image processing system according to one embodiment of the present invention. AS illustrated in FIG. 5, the image processing system 500 comprises an image sensor 501 and a digital signal processor 503 with a frame buffer 505. The operations for the image sensor 501 and the digital signal processor 503 have been depicted in above-mentioned description, thus are omitted for brevity here. The frame buffer 505 is applied to buffer images, such that the displacement images and the image variation tendency can be computed. Please note the operations for the image sensor 501 and the digital signal processor 503 can be controlled by a controller such as a CPU, which is not illustrated here.

In view of above-mentioned embodiments, the environment images and gesture images can be clearly distinguished, and the best resolution for an image sensor and/or the best frame rate can be selected.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, applied to an image processing system comprising an image sensor, comprising:
   (a) capturing a plurality of first images via the image sensor applying a first resolution and detecting if brightness variation between any one of the first images and a consecutive first image is larger than or equal to a predetermined value;
   (b) computing an image variation tendency between the first images at different timings if the brightness variation is larger than or equal to the predetermined value, and not computing the image variation tendency if the brightness variation is smaller than the predetermined value; and
   (c) controlling the image sensor to apply a second resolution higher than the first resolution if the image variation tendency matches a predetermined tendency.

2. The image processing method of claim 1, wherein the step (b) comprises:
   performing subtracting operations for consecutive images of the first images to generate displacement images;
   computing centroids of the displacement images; and
   determining the image variation tendency according to a trail of the centroids.

3. The image processing method of claim 1, wherein the step (b) comprises:
   performing subtracting operations for consecutive images of the first images to generate displacement images;
   computing motion vectors of the displacement images; and
   determining the image variation tendency according to the motion vectors.

4. The image processing method of claim 1, wherein the predetermined tendency indicates a specific object is performing a predetermined operation.

5. The image processing method of claim 4, wherein the specific object is a hand, wherein the predetermined operation is a gesture.

6. The image processing method of claim 1, wherein the step(a) further captures the first images via the image sensor applying a first frame rate, wherein the step(c) further controls the image sensor to apply a second frame rate higher than the first frame rate if the image variation tendency matches the predetermined tendency.

7. An image processing system, comprising:
an image sensor, configured to capture a plurality of first images via the image sensor applying a first resolution;
a digital signal processor, configured to compute an image variation tendency between the first images at different timings;
wherein the image sensor applies a second resolution higher than the first resolution if the image variation tendency matches a predetermined tendency;
wherein the image processing system further comprises a control unit configured to perform the following steps:
detecting if brightness variation between any one of the first images and a consecutive first image is larger than or equal to a predetermined value; and
activating the digital signal processor to perform the step of computing an image variation tendency between the first images at different timings if the brightness variation is larger than or equal to the predetermined value, and not activating the digital signal processor to perform the step of computing an image variation tendency between the first images at different timings if the brightness variation is smaller than the predetermined value.

8. The image processing system of claim 7, wherein the digital signal processor further performs following steps:
performing subtracting operations for consecutive images of the first images to generate displacement images;
computing centroids of the displacement images; and
determining the image variation tendency according to a trail of the centroids.

9. The image processing system of claim 7, wherein the digital signal processor further performs following steps:
performing subtracting operations for consecutive images of the first images to generate displacement images;
computing motion vectors of the displacement images; and
determining the image variation tendency according to the motion vectors.

10. The image processing system of claim 7, wherein the predetermined tendency indicates a specific object is performing a predetermined operation.

11. The image processing system of claim 10, wherein the specific object is a hand, wherein the predetermined operation is a gesture.

12. The image processing system of claim 7, wherein the image sensor captures the first images via a first frame rate, wherein the image sensor applies a second frame rate higher than the first frame rate if the image variation tendency matches the predetermined tendency.

* * * * *